US008239857B2

(12) United States Patent
Osada

(10) Patent No.: US 8,239,857 B2
(45) Date of Patent: Aug. 7, 2012

(54) INFORMATION PROCESSING APPARATUS AND METHOD OF INSTALLING APPLICATION PROGRAM

(75) Inventor: Mamoru Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1353 days.

(21) Appl. No.: 11/567,062

(22) Filed: Dec. 5, 2006

(65) Prior Publication Data

US 2007/0169119 A1  Jul. 19, 2007

(30) Foreign Application Priority Data

Dec. 8, 2005 (JP) .................................. 2005-355139

(51) Int. Cl.
G06F 9/445 (2006.01)
(52) U.S. Cl. ........ 717/177; 717/168; 717/175; 717/176; 717/178
(58) Field of Classification Search .................. None
See application file for complete search history.

(56) References Cited

U.S. PATENT DOCUMENTS

| 6,775,830 | B1 * | 8/2004 | Matsunami et al. ........... 717/176 |
| 6,948,168 | B1 * | 9/2005 | Kuprionas ..................... 717/178 |
| 7,305,456 | B2 * | 12/2007 | Kobayashi ..................... 709/218 |
| 7,353,304 | B2 * | 4/2008 | Abe ................................ 710/72 |
| 7,380,243 | B2 * | 5/2008 | Sugishita et al. .............. 717/168 |
| 7,412,526 | B2 * | 8/2008 | Fujisawa ........................ 709/229 |
| 7,430,689 | B1 * | 9/2008 | Adams ............................ 714/39 |
| 7,472,286 | B2 * | 12/2008 | Burkhardt et al. ............. 713/193 |
| 7,496,951 | B2 * | 2/2009 | Okazawa et al. ................. 726/3 |
| 2003/0093768 | A1 * | 5/2003 | Suzuki .......................... 717/100 |
| 2004/0034862 | A1 * | 2/2004 | Kadota .......................... 719/321 |
| 2004/0194084 | A1 * | 9/2004 | Matsunami et al. ........... 717/174 |
| 2004/0230842 | A1 * | 11/2004 | Osada ............................ 713/202 |
| 2004/0254888 | A1 * | 12/2004 | Tanaka et al. .................... 705/59 |
| 2005/0044546 | A1 * | 2/2005 | Niebling et al. .............. 717/177 |
| 2005/0229257 | A1 * | 10/2005 | Kim et al. ....................... 726/27 |
| 2006/0026105 | A1 * | 2/2006 | Endoh ............................ 705/59 |
| 2006/0123413 | A1 * | 6/2006 | Collet et al. ................... 717/174 |
| 2006/0123414 | A1 * | 6/2006 | Fors et al. ...................... 717/177 |
| 2006/0200420 | A1 * | 9/2006 | Osada ............................. 705/59 |
| 2007/0016902 | A1 * | 1/2007 | Shozaki et al. ............... 717/174 |
| 2007/0100969 | A1 * | 5/2007 | Hu ................................. 709/220 |
| 2008/0134171 | A1 * | 6/2008 | Matsunami et al. ........... 717/177 |
| 2009/0228982 | A1 * | 9/2009 | Kobayashi ....................... 726/26 |

FOREIGN PATENT DOCUMENTS

| JP | 08-055069 A | 2/1996 |
| JP | 2002-007135 A | 1/2002 |
| JP | 2005-032184 A | 2/2005 |
| JP | 2005-078167 A | 3/2005 |
| JP | 2005-267405 A | 9/2005 |
| JP | 2005-321967 A | 11/2005 |

* cited by examiner

Primary Examiner — Isaac Tecklu
(74) Attorney, Agent, or Firm — Canon USA Inc. IP Division

(57) ABSTRACT

An information processing apparatus includes a receiving unit configured to receive an application including a first application for the information processing apparatus, and a second application for a device other than the information processing apparatus, an installing unit configured to install the application received by the receiving unit, and an acquiring unit configured to acquire information for identifying a device on which to install the second application included in the application, wherein the installing unit installs the first application included in the application on the information processing apparatus, and sends the second application included in the application to the device identified by the information acquired by the acquiring unit.

6 Claims, 12 Drawing Sheets

FIG. 6

```
PROPERTY INFORMATION Y

PLURAL LICENSE STORAGE:True ─────────────── 6001
License-a.lic:Application-a.jar ─────────── 6002
License-b.lic:Application-a.jar ─────────── 6003
INFORMATION PROCESSING APPARATUS 1001:SN-abcd12345 ─── 6004
MULTIFUNCTION PERIPHERAL 1003:SN-efgh67890 ─── 6005
APPLICATION:c2b291f0-7e8b-11d6-a44a-005004d0f32b ─── 6006
```
4013

INFORMATION PROCESSING APPARATUS AND METHOD OF INSTALLING APPLICATION PROGRAM

BACKGROUND OF THE INVENTION

1. Field of the Invention

The present invention relates to an information processing apparatus and a method for installing an application program.

2. Description of the Related Art

Some recent personal computers (hereinafter referred to as PCs) can operate in cooperation with a multifunction peripheral which is connected thereto via a network and has an image forming function and the like.

Further, in recent years, like PCs, multifunction peripherals loaded with Java® can install application programs (hereinafter referred to as applications) from other devices on the network. Accordingly, the multifunction peripheral, in expanding its functions, can install new applications from other devices connected thereto via the network.

In a system that offers functions by cooperation between a PC and a multifunction peripheral, methods for newly expanding a function include installing an application on either the PC or the multifunction peripheral. Alternatively, an application can be installed on both the PC and the multifunction peripheral so as to realize a new function.

Japanese Patent Application Laid-Open No. 2002-007135 discusses a method for sequentially installing programs required for plural terminals connected via network. However, this method cannot be applied to a system that realizes cooperative functions by installing applications on both a PC and a multifunction peripheral.

Japanese Patent Application Laid-Open No. 2005-032184 discusses a method for installing software programs that have a relation to become a pair such as a program for a center machine and a program for a terminal that are connected to a network. More specifically, a software providing device sends files including both of the programs to the center machine. The center machine extracts the program for the center machine and installs it. Then, the center machine extracts the program for the terminal and sends it to the terminal. The terminal installs the program for the terminal received from the center machine.

According to Japanese Patent Application Laid-Open No. 2005-032184, installation effort can be eased. However, it is necessary for the center machine itself to store information for specifying the terminal that makes a pair with the center machine, to which the software program is installed. That is, the relation between the center machine and the terminal is always fixed and, thus, cannot be changed depending on a program to be installed.

Furthermore, according to Japanese Patent Application Laid-Open No. 2005-032184, control over installation cannot be switched between the case where software programs having a relation to make a pair are received and the case when a software program to be installed only on the center machine is received.

SUMMARY OF THE INVENTION

The present invention is directed to a method for automatically installing applications for mutually cooperating devices to the respective devices.

According to an aspect of the present invention, an information processing apparatus includes a receiving unit configured to receive an application, wherein the application includes a first application associated with the information processing apparatus, and a second application associated with a device other than the information processing apparatus; an installing unit configured to install the application received by the receiving unit; and an acquiring unit configured to acquire information identifying the device associated with the second application included in the application. The installing unit installs the first application included in the application on the information processing apparatus, and sends the second application included in the application to the device identified by the information acquired by the acquiring unit.

According to another aspect of the present invention, an information processing apparatus includes a receiving unit configured to receive an application; an installing unit configured to perform processing concerning installation of the application received by the receiving unit; and a determining unit configured to determine whether the application includes an application associated with an external device other than the information processing apparatus. If the determining unit determines that the application does not include an application associated with an external device other than the information processing apparatus, the installing unit installs the application on the information processing apparatus, and wherein, if the determining unit determines that the application includes an application associated with an external device other than the information processing apparatus, the installing unit identifies a first application for the information processing apparatus included in the application, installs the identified first application on the information processing apparatus, identifies a second application associated with the external device included in the application, and sends the identified second application to the external device.

According to yet another aspect of the present invention, a method for installing an application on an information processing apparatus includes receiving an application that includes a first application associated with the information processing apparatus and a second application associated with a device other than the information processing apparatus; installing the application received; and acquiring information identifying the device associated with the second application included in the application, wherein installing the application received includes installing the first application included in the application on the information processing apparatus and sending the second application included in the application to the device identified by the information acquired.

According to yet another aspect of the present invention, a method for installing an application on an information processing apparatus includes receiving an application, performing processing concerning installation of the application received; and determining whether the application includes an application associated with an external device other than the information processing apparatus, wherein, if it is determined that the application does not include an application associated with an external device other than the information processing apparatus, installing the application on the information processing apparatus, and if it is determined that the application includes an application associated with an external device other than the information processing apparatus, identifying a first application associated with the information processing apparatus included in the application, installing the identified first application on the information processing apparatus, identifying a second application associated with the external device included in the application, and sending the identified second application to the external device.

According to an exemplary embodiment of the present invention, applications for mutually cooperating devices can be automatically installed on the respective devices.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of the contents of property information.

DETAILED DESCRIPTION OF THE EMBODIMENTS

Various exemplary embodiments, features, and aspects of the invention will be described in detail below with reference to the drawings.

First Exemplary Embodiment

Figure 1:
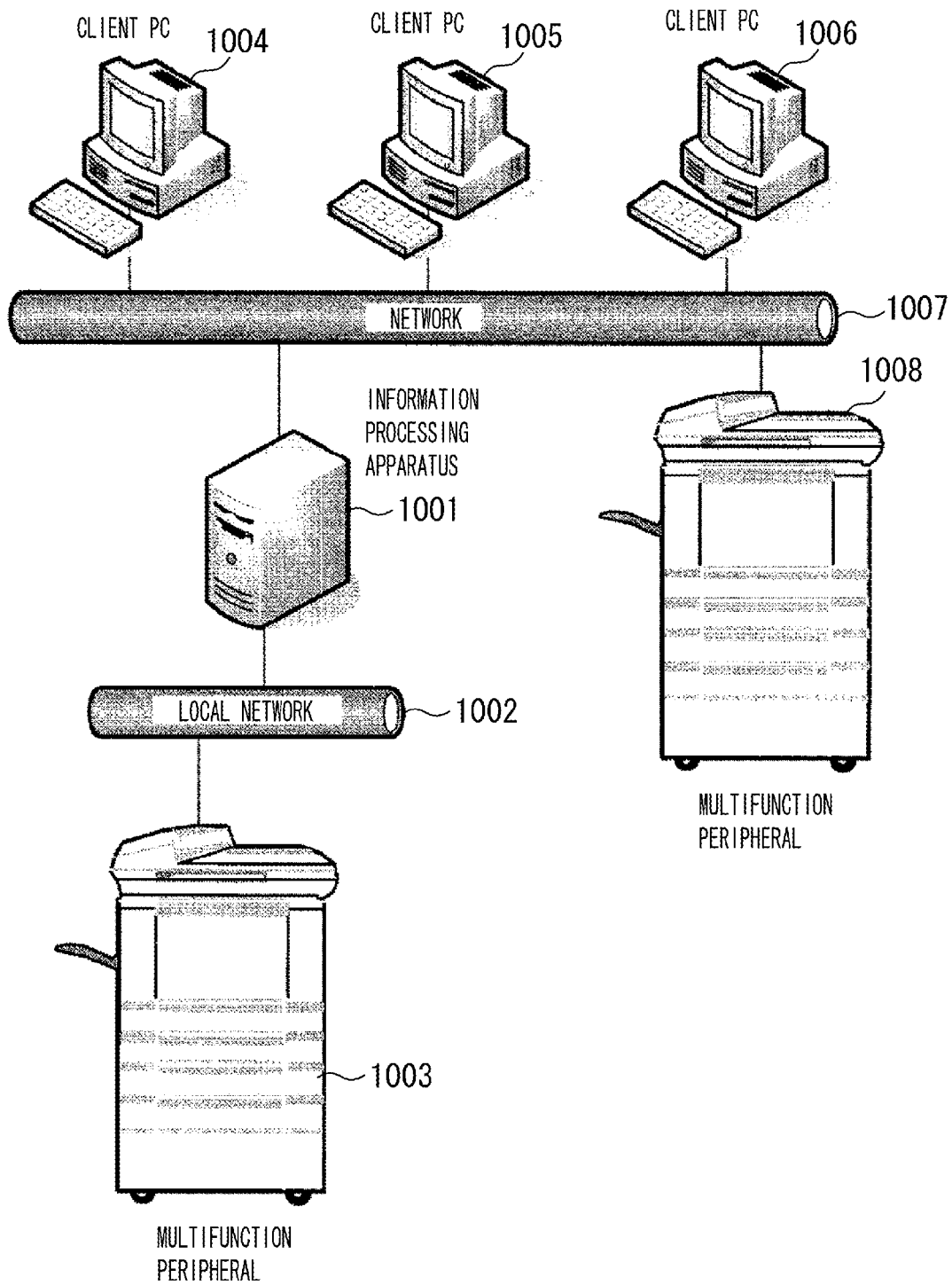
FIG. 1 illustrates a system configuration of an example of an image forming system.

FIG. 1 illustrates a system configuration of an example of an image forming system. An information processing apparatus 1001, in association with a multifunction peripheral 1003 to be described later herein, provides a storage function that the multifunction peripheral 1003 provides and an expanded function of a sending function, via a network 1007, to client PCs 1004, 1005, 1006, and the like. A local network 1002 is a network that connects the information processing apparatus 1001 and the multifunction peripheral 1003 and is accessible from both the information processing apparatus 1001 and the multifunction peripheral 1003. With regard to a connection medium, any medium may be employed so long as it is a connection medium that enables bidirectional communications.

The multifunction peripherals 1003 and 1008 read a document, print out read document data, or send read document data to various devices. Client PCs 1004 to 1006 instruct the multifunction peripheral 1003 or 1008 to print document data via the information processing apparatus 1001. Alternatively, the client PCs 1004 to 1006 store document data read by the multifunction peripheral 1003 or 1008 via the information processing apparatus 1001.

The network 1007 connects the information processing apparatus 1001, the client PCs 1004 to 1006, and the multifunction peripheral 1008 and is accessible from the respective devices. With regard to a connection medium, any medium may be employed so long as it is a connection medium that enables bidirectional communications. Further, as a protocol used for sending and receiving data among the information processing apparatus 1001, the client PCs 1004 to 1006, and the multifunction peripheral 1008, any of existing protocols including Hyper Text Transfer Protocol (HTTP), Simple Object Access Protocol (SOAP), and File Transfer Protocol (FTP) may be employed. The protocol to be used for sending and receiving data may also be a completely original application protocol.

Exemplary functions to be provided by cooperation between the multifunction peripheral 1003 and the information processing apparatus 1001 are described next. For example, the multifunction peripheral 1003 sends read document image data to the information processing apparatus 1001, and the information processing apparatus 1001 performs character recognition processing on the sent image data, extracts text data, and stores the text data in the information processing apparatus 1001. Further, for example, the multifunction peripheral 1003 sends read document data to the information processing apparatus 1001, and the information processing apparatus 1001 sends the received image data to a predetermined destination with a predetermined protocol. In order to attain these functions, the multifunction peripheral 1003 requires an application for reading document image data and sending the image data to the information processing apparatus 1001. Additionally, the information processing apparatus 1001 requires an application for performing character recognition on the received image data and performing processing for sending.

The multifunction peripheral 1003 and the multifunction peripheral 1008 are loaded with an execution environment for Java® and, thus, can execute Java® applications.

Figure 2:
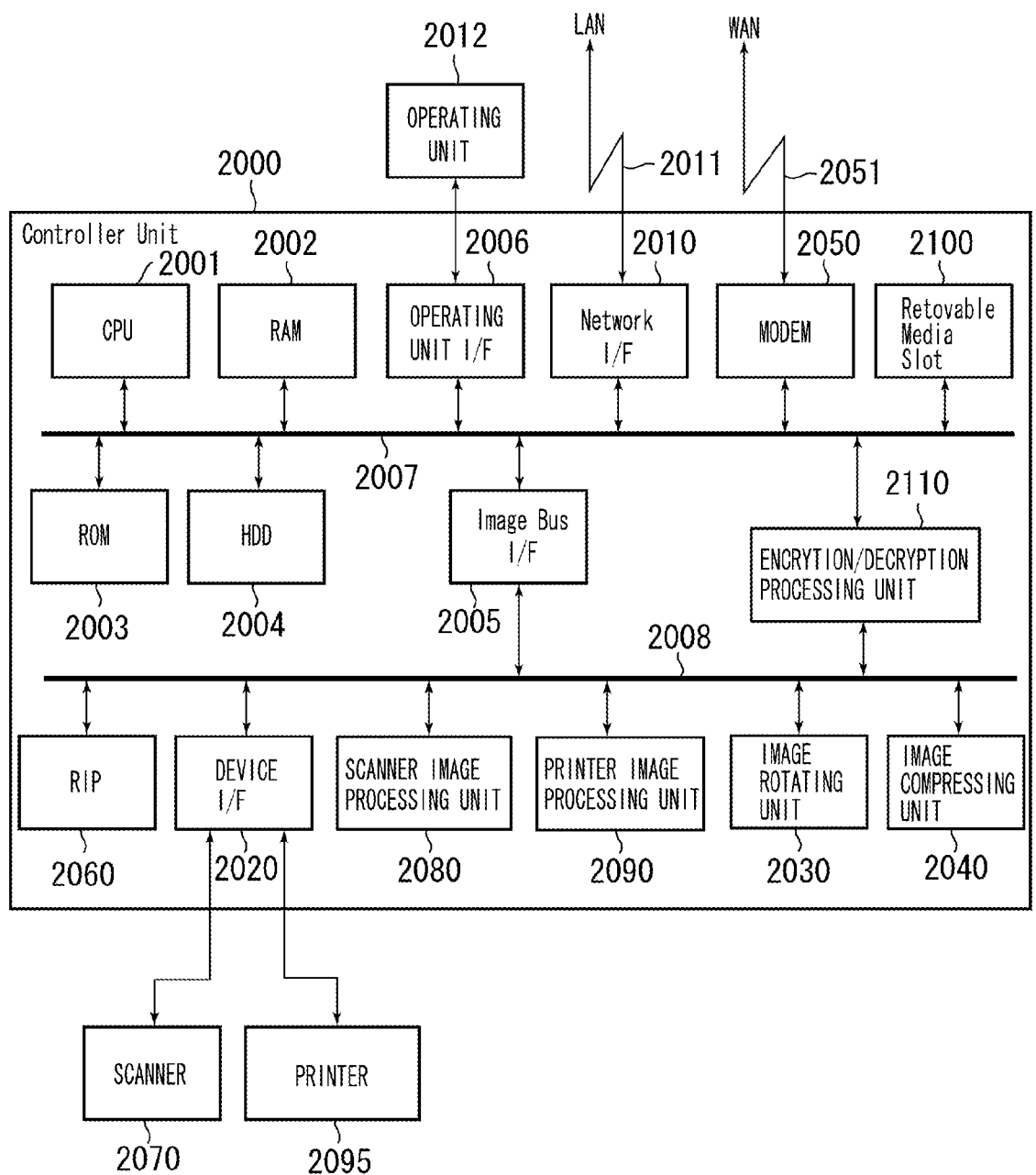
FIG. 2 illustrates a system configuration of hardware of a multifunction peripheral.

FIG. 2 illustrates an exemplary system configuration of hardware of the multifunction peripheral 1003 or 1008. A controller unit 2000 can input and output image information and device information. The controller unit 2000 is connected to a scanner 2070, serving as an image input device, and a printer 2095, serving as an image output device, and is also connected to a local area network (LAN) 2011 and a wide area network (WAN) 2051.

A central processing unit (CPU) 2001 is a controller that controls the system of the multifunction peripheral 1003 or 1008. A random access memory (RAM) 2002 is a system work memory for the CPU 2002 to operate, and is also an image memory for temporarily storing image data, or a work memory in which various applications are executed.

A ROM 2003 is a boot ROM, in which a boot program of the system is stored. An HDD 2004 is a hard disk drive, which stores system software (system software program), image data, various applications (various application programs), and histories of various jobs processed in the multifunction peripheral 1003 or 1008. Each program, as necessary, is read into the RAM 2002 and executed by the CPU 2001. The multifunction peripheral 1003 or 1008 can share memory areas with a specified client PC via a network interface (I/F) 2010.

An operating unit I/F 2006 is an interface unit between an operating unit (UI) 2012 having a touch panel and the controller unit 2000, and outputs image data to be displayed on the operating unit 2012 to the operating unit 2012. Further, the operating unit I/F 2006 can transmit information that a user of the multifunction peripheral inputs via the operating unit 2012 to the CPU 2001.

The network I/F 2010 connects the controller unit 2000 to the LAN 2011 and inputs and outputs information. A modem 2050 connects the controller unit 2000 to the WAN 2051 and inputs and outputs information. A removable media slot 2100 is a slot to which a removable data storage medium such as a memory card can be connected, and can store and read image data. The above-described devices are arranged on a system bus 2007.

An image bus I/F 2005 is a bus bridge that connects the system bus 2007 and an image bus 2008 that transfers image data at a high speed, and converts data structures. The image bus 2008 includes a PCI bus or an IEEE 1394 bus. The following devices are arranged on the image bus 2008.

A raster image processor (RIP) 2060 rasterizes page description language (PDL) code into bitmap images. A device I/F unit 2020 connects the scanner 2070 and the printer 2095 to the controller unit 2000, and performs a sync/async system conversion of image data.

A scanner image processing unit 2080 corrects, processes, and edits input image data. A printer image processing unit 2090 performs correction, resolution conversion, and the like on image data to be printed out. An image rotating unit 2030 rotates image data. An image compressing unit 2040 performs compression and expansion processes of multivalued image data into JPEG, or binary image data into JBIG, MMR, or MH. An encryption/decryption processing unit 2110 is a hardware accelerator board that performs data encryption/decryption processes using a specified key and the like.

Figure 3:
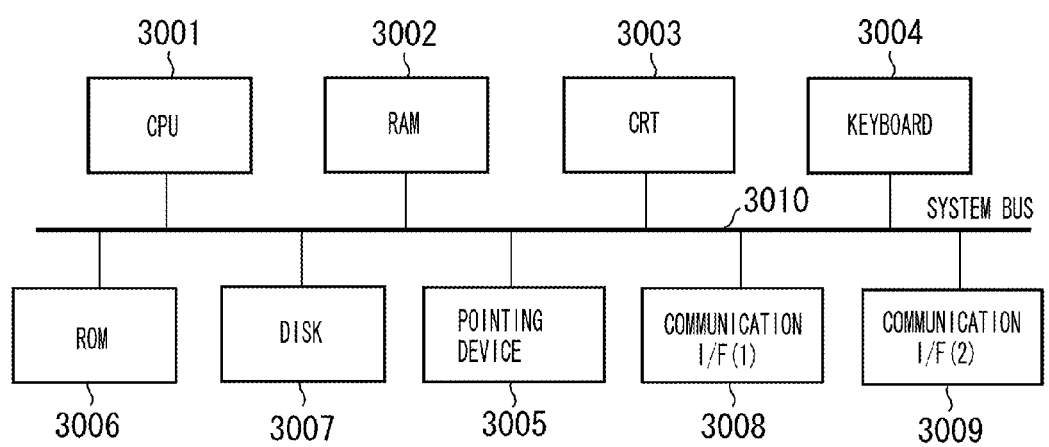
FIG. 3 illustrates a system configuration of hardware of an information processing apparatus.

FIG. 3 illustrates a system configuration of hardware of the information processing apparatus 1001. The hardware structures of the client PCs 1004, 1005, and 1006 are similar to that of the information processing apparatus 1001. The information processing apparatus 1001 includes a CPU 3001, a random access memory (RAM) 3002, a cathode ray tube (CRT) 3003, and a keyboard 3004, which are mutually connected via a system bus 3010. Further, the information processing apparatus 1001 includes a read-only memory (ROM) 3006, a disk 3007, a pointing device 3005, a communication I/F (1) 3008, and a communication I/F (2) 3009, which are mutually connected via the system bus 3010.

A program for controlling the information processing apparatus 1001 is stored in the ROM 3006 or the disk 3007, and is read, as necessary, into the RAM 3002 and executed by the CPU 3001.

The CPU 3001 performs displaying via the CRT 3003, and receives a user's instruction via the keyboard 3004 and the pointing device 3005. Further, the CPU 3001 performs communications with external devices (client PC, and multifunction peripheral) via the communication I/F (1) 3008 or the communication I/F (2) 3009.

In the present exemplary embodiment, unless otherwise specified, the CPU 3001 receives user's inputs from the keyboard 3004 and the pointing device 3005 via the system bus 3010. Further, the CPU 3001 controls the RAM 3002, the CRT 3003, the ROM 3006, the disk 3007, the communication I/F (1) 3008, and the communication I/F (2) 3009.

The communication I/F (1) 3008 is connected, via the network 1007, with the client PCs 1004 to 1006 and the multifunction peripheral 1008. The communication I/F (2) 3009 is connected with the multifunction peripheral 1003 via the local network 1002. Further, the information processing apparatus 1001 is loaded with an execution environment for Java®, and, thus can execute Java® applications, like the multifunction peripherals 1003 and 1008.

Figure 4:
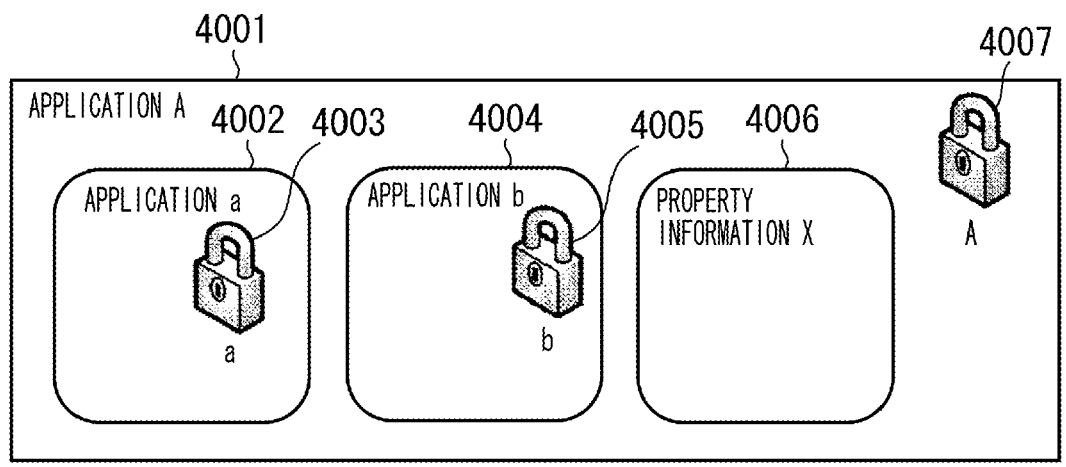
FIG. 4 is a block diagram showing an example of the structure of applications and licenses.
Figure 4:
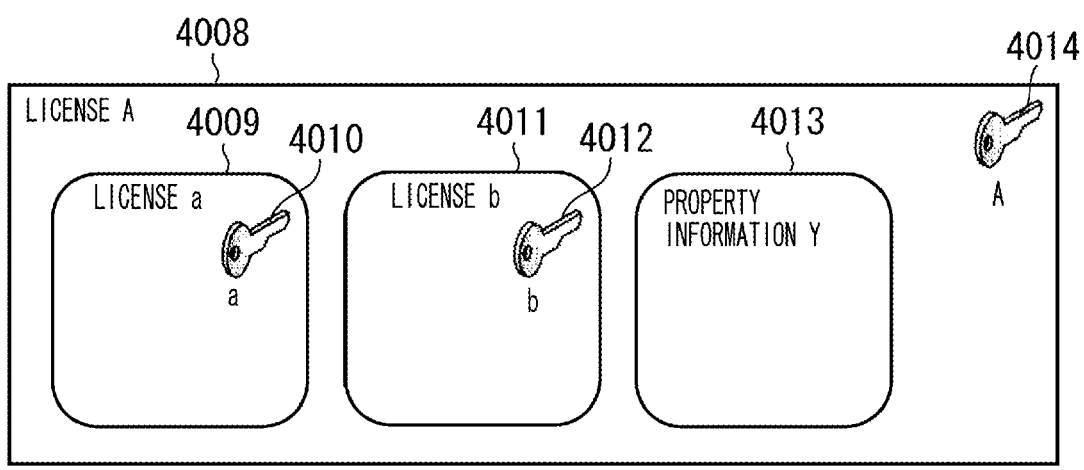

FIG. 4 is a block diagram showing an example of the structure of applications and licenses in the present exemplary embodiment. An application A 4001 includes an application a 4002, an application b 4004, and property information X 4006. Further, the application a 4002 is encrypted with a key a 4003, and the application b 4004 is encrypted with a key b 4005. Furthermore, the application A 4001 is encrypted with a key A 4007. The information processing apparatus 1001 installs the application a 4002, and the multifunction peripheral 1003 installs the application b 4004. The information processing apparatus 1001 and the multifunction peripheral 1003 run these applications so as to realize a function provided by cooperation between the information processing apparatus 1001 and the multifunction peripheral 1003. Hereinafter, descriptions are made on the assumption that a multifunction peripheral to be cooperated with the information processing apparatus 1001 is the multifunction peripheral 1003. However, it may be also the multifunction peripheral 1008.

A license A 4008 includes a license a 4009, a license b 4011, and property information Y 4013. The license a 4009 stores a decryption key a 4010, and the license b 4011 stores a decryption key b 4012. Further, the license A 4008 itself stores a decryption key A 4014.

The relation between the application a 4002 and the application b 4004 and that between the license a 4009 and the license b 4011 are described later with reference to FIG. 6. In the present exemplary embodiment, descriptions are made on the assumption that the license a 4009 and the like are not encrypted. However, they may be encrypted with a predetermined method such as a public key cryptosystem.

Figure 5:
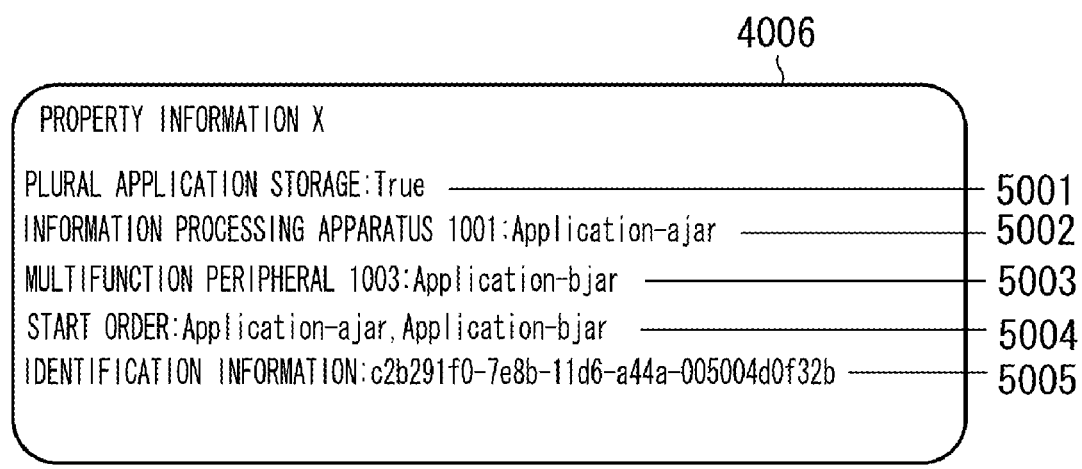
FIG. 5 illustrates an example of the contents of property information.

FIG. 5 illustrates an example of the contents of the property information X 4006. In the property information X 4006, various kinds of information concerning the application A 4001 are described. Information 5001 is provided for identifying whether plural applications are stored in the application A 4001. In the example shown in FIG. 5, "True" is set therein. The plural applications correspond to an application to be installed on the information processing apparatus 1001 and an application to be installed on the multifunction peripheral 1003. Information 5002 is provided for identifying the application a 4002 for the information processing apparatus 1001 included in the application A 4001. In the present exemplary embodiment, the information 5002 uses the file name of the application a 4002.

Information 5003 is provided for identifying the application b 4004 for the multifunction peripheral 1003. In the present exemplary embodiment, the information 5003 uses the file name of the application b 4004. Information 5004 indicates the start order (launching order) of applications. In the present exemplary embodiment, applications are started (launched) in a sequential order of Application-a.jar 5002 and Application-b.jar 5003. Information 5005 is provided for uniquely identifying the application A 4001. In the present exemplary embodiment, the information 5005 uses a serial number uniquely generated by developers or vendors of applications.

The property information X in the present exemplary embodiment handles a text format. However, a markup language format, such as XML, or a binary format can also be employed. This is similarly applied to the format of the property information Y, the property information m, and the property information n to be described later.

FIG. 6 illustrates an example of the contents of the property information Y 4013. Information 6001 is provided for identifying whether plural licenses are stored in the license a 4009. In the example shown in FIG. 6, "True" is set therein. Information 6002 is provided for associating the license file stored in the license a 4009 with an application to make a pair therewith. In the present exemplary embodiment, the information 6002 indicates that the license file name License-a.lic is the license of Application-a.jar. Similarly, information 6003 is provided for associating the license file stored in the license b 4011 with an application to make a pair therewith. In the present exemplary embodiment, the information 6003 indicates that the license file name License-b.lic is the license of Application-b.jar.

Information 6004 is provided for identifying the individual piece of the information processing apparatus 1001 to which installation is permitted. In the present exemplary embodiment, the information 6004 indicates that installation can be made on only an information processing apparatus 1001 having identification information SN-abcd12345. Information 6005 is provided for identifying the individual piece of the multifunction peripheral 1003 to which installation is permitted. In the present exemplary embodiment, the information 6005 indicates that installation can be made on only a multifunction peripheral 1003 having identification information SN-efgh67890. Information 6006 is provided for identifying an application to make a pair with the license A 4008. The information 6006, being the same value as that of the information 5005, indicates that the license 4008 is paired with the application A 4001.

Figure 7:
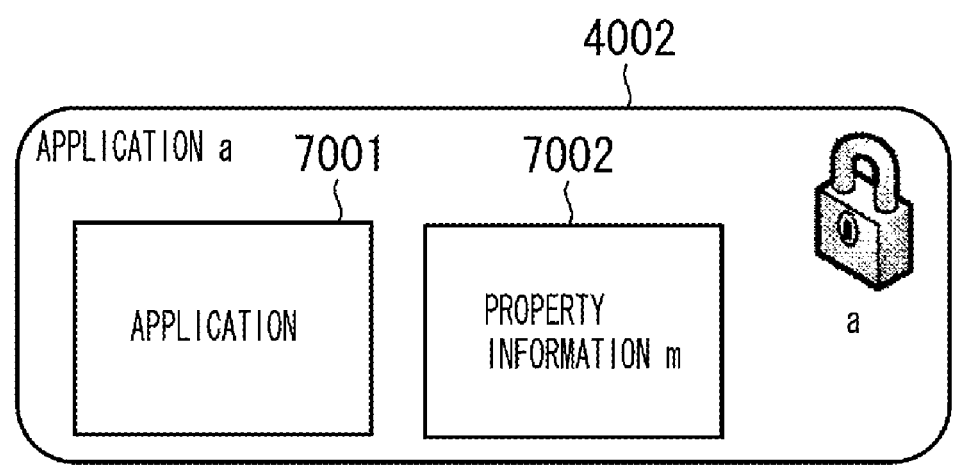
FIG. 7 is a block diagram showing an example of the structure of an application.

FIG. 7 is a block diagram showing an example of the structure of the application a 4002. Application 7001 is a substance of the application a 4002, which is a program that actually runs on the information processing apparatus 1001. Property information m 7002 indicates the property information of the application a 4002, in which information illustrated in FIG. 9 to be described later herein is stored. In the present exemplary embodiment, the application b 4004 has a similar structure as that in FIG. 7.

Figure 8:
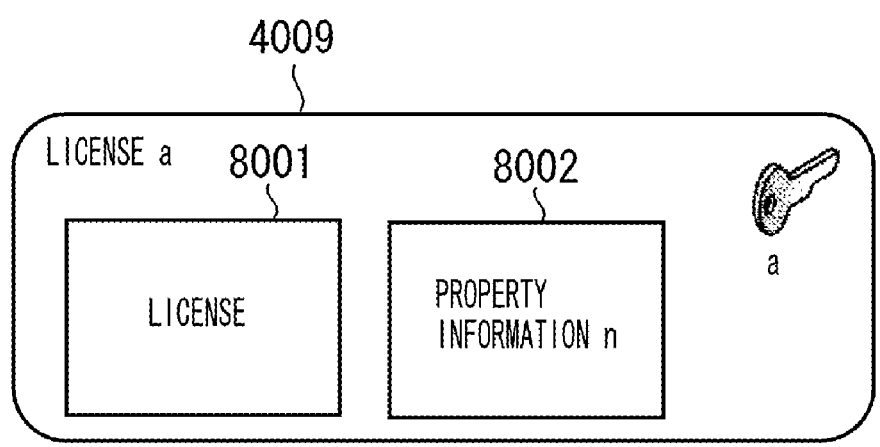
FIG. 8 is a block diagram showing an example of the structure of a license.

FIG. 8 is a block diagram showing an example of the structure of the license a 4009. License 8001 is a substance of the license a 4009, which is referred to when the application a 4002 is installed on the information processing apparatus 1001. Property information n 8002 indicates the property information of the license a 4009, in which information illustrated in FIG. 10 to be described later herein is stored. In the present exemplary embodiment, the license 8001 and the property information n 8002 are shown with different blocks. However, they do not have to be physically different in some data formats. Further, in the exemplary embodiment, the license b 4011 has a similar structure as that in FIG. 8.

Figure 9:
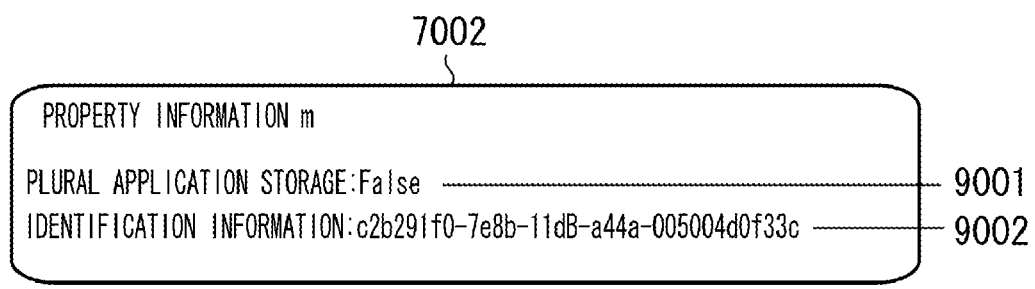
FIG. 9 illustrates an example of the contents of property information.

FIG. 9 illustrates an example of the contents of the property information m 7002. Information 9001 is provided for identifying whether plural applications are stored in the application a 4002. In the example shown in FIG. 9, "False" is set therein. Information 9002 is provided for uniquely identifying the application a 4002.

Figure 10:
FIG. 10 illustrates an example of the contents of property information.

FIG. 10 illustrates an example of the contents of the property information n 8002. Information 10001 is provided for identifying whether plural licenses are stored in the license a 4009. In the example shown in FIG. 10, "False" is set therein. Information 10002 is provided for identifying the individual piece of the information processing apparatus 1001 to which installation is permitted. In the present exemplary embodiment, the information 10002 indicates that installation can be made on only an information processing apparatus 1001 having identification information SN-abcd12345. Information 10003 is provided for identifying an application to make a pair with the license a 4009. The information 10003, being the same value as that of the information 9002, indicates that the license a 4009 is paired with the application a 4002.

Figure 11:
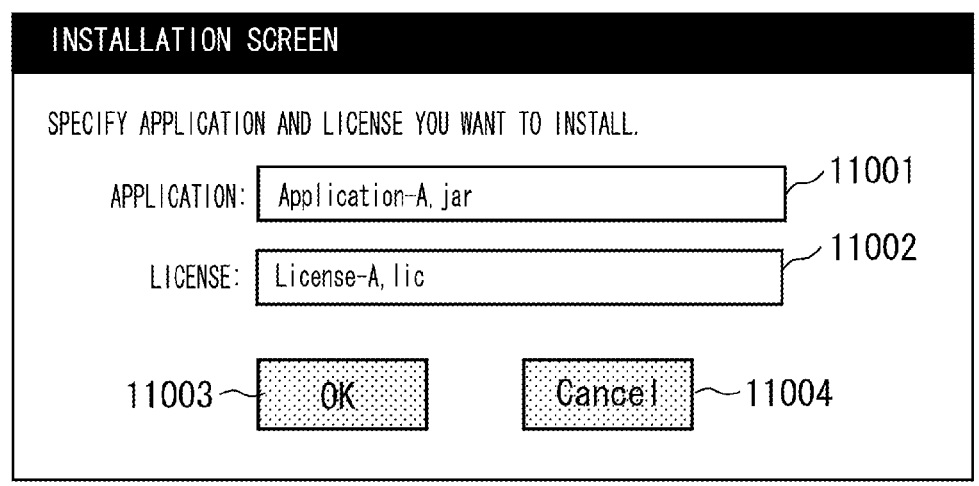
FIG. 11 illustrates an example of an application installation screen of an information processing apparatus.

FIG. 11 illustrates an example of the application installation screen of the information processing apparatus 1001. An HTTP server is loaded to the information processing apparatus 1001. The application installation screen is sent from the information processing apparatus 1001 at the request of a web browser of the client PC 1004. The client PC 1004 (hereinafter, the PC 1004 may be replaced with the PC 1005 or the PC 1006) that receives the application installation screen via the communication I/F (1) 3008 and the network 1007 causes the web browser to display the application installation screen on a CRT. Alternatively, on the CRT 3003 of the information processing apparatus 1001, the installation screen shown in FIG. 11 may be displayed.

An entry field 11001 is used for a user to specify an application stored on the disk 3007 of the client PC 1004. In the example shown, the file name of the application A 4001 is entered. An entry field 11002 is used for the user to specify a license stored on the disk 3007 of the client PC 1004. In the example shown, the file name of the license A 4008 is entered. A button 11003 is used for a user to instruct the start of installation, which has the function to send entered information to the information processing apparatus 1001. A button 11004 is used for the user to instruct canceling the processing on the application installation screen and returning to another operation screen (not illustrated).

Figure 12:
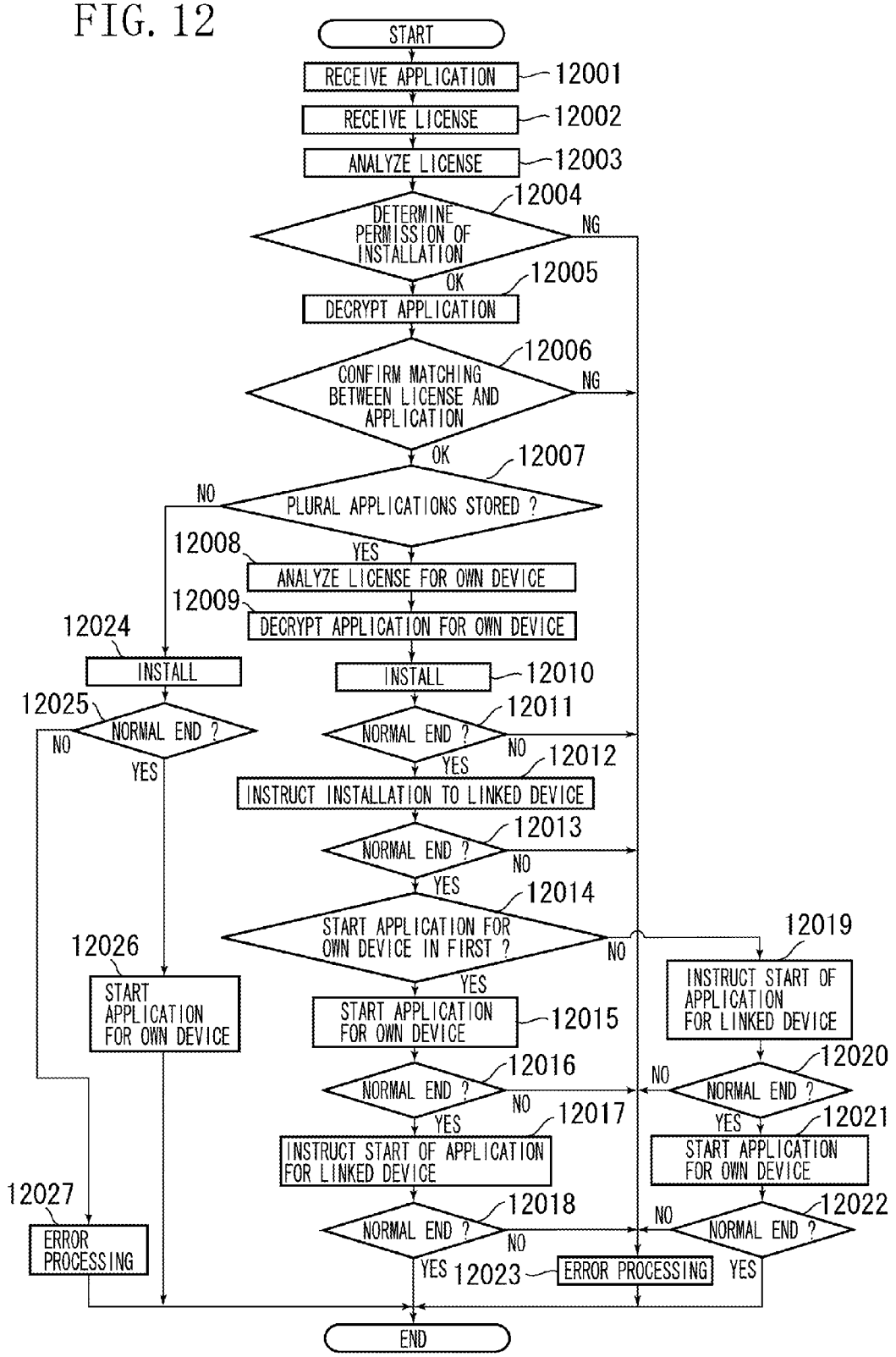
FIG. 12 is a flowchart showing processing performed by an application installing unit of the information processing apparatus.

FIG. 12 is a flowchart illustrating a part of the processing performed by an application installing unit (not illustrated) of the information processing apparatus 1001. The application installing unit includes a software module executed by the CPU 3001 of the information processing apparatus 1001 to install an application on the information processing apparatus 1001. The application installing unit is stored on the disk 3007 of the information processing apparatus 1001. The application installing unit can include plural program modules according to the respective steps in FIG. 12.

The flowchart in FIG. 12 illustrates the process where, more specifically, the button 11003 in FIG. 11 is pressed and an installation instruction accompanied with the application A 4001 and the license A 4008 is received and recognized. The flowchart in FIG. 12 is executed by the CPU 3001 of the information processing apparatus 1001.

In step 12001, the application installing unit receives the application A 4001. The application installing unit stores the application A 4001 received via the communication I/F (1) 3008 in a specified position in the disk 3007.

In step 12002, the application installing unit receives the license A 4008. The application installing unit stores the license A 4008 received via the communication I/F (1) 3008 in a specified position of the disk 3007. The order of step 12001 and step 12002 may be reversed.

In step 12003, the application installing unit analyzes the license A 4008 received in step 12002. The application installing unit analyzes the contents of the property information Y 4013.

In step 12004, the application installing unit determines whether to permit installation. The application installing unit compares the information 6004 of the property information Y 4013 with the information identifying the information processing apparatus 1001 to determine whether they agree with each other. In exemplary embodiments, the information identifying the information processing apparatus 1001 itself is stored in the disk 3007 or the ROM 3006. Further, the application installing unit acquires the information identifying the multifunction peripheral 1003 from the multifunction peripheral 1003 connected via the communication I/F (2) 3009, and determines whether the acquired information and the information 6005 agree with each other. In exemplary embodiments, the information identifying the information processing apparatus 1001 used for the determination is stored in, for example, the ROM 3006 or the disk 3007.

When it is determined in step 12004 that the information 6004 of the property information Y 4013 and the information identifying the information processing apparatus 1001 agree with each other as the results of the two determinations, the application installing unit proceeds to step 12005. On the other hand, if one of the determinations is negative, the application installing unit proceeds to step 12023.

In step 12005, the application installing unit decrypts the application A 4001 stored in step 12001. The application installing unit decrypts the application A 4001 using the key A 4014 of the license A 4008. The application installing unit stores the decrypted result on the RAM 3002 or the disk 3007.

In step 12006, the application installing unit determines the matching between the license and the application. The application installing unit determines whether the information 5005 and the information 6006 agree with each other. When they agree with each other as the result of the determination, the application installing unit proceeds to step 12007. On the other hand, if the determination is negative, the application installing unit proceeds to step 12023.

In step 12007, the application installing unit determines whether plural applications are stored in the application A 4001. The application installing unit determines whether the information 5001 is true. In the present exemplary embodiment, when the information 5005 and the information 6006 agree with each other, the same value is stored in the information 5001 and the information 6001. If it is determined that plural applications are stored, the application installing unit proceeds to step 12008, otherwise, the application installing unit proceeds to step 12024. Alternatively, the determination can be made by checking whether an application that a device other than the information processing apparatus 1001 (the multifunction peripheral 1003 in the example shown in FIG. 5) installs is described in the information 5003.

In step 12008, the application installing unit analyzes a license for its own device. The application installing unit identifies the license a 4009 from the information 5002 and the information 6002, and acquires the property information n 8002. In the present exemplary embodiment, when the information 5005 and the information 6006 agree with each other, the information 6004 and the information 10002 agree with each other.

In step 12009, the application installing unit decrypts an application for its own device. The application installing unit identifies the application a 4002 from the information 5002, and decrypts the application a 4002 using the decryption key a 4010 of the license a 4009. The application installing unit stores the decrypted result on the RAM 3002 or the disk 3007.

In step 12010, the application installing unit installs an application. The application installing unit installs the decrypted application a 4002 and the license 8001 on the information processing apparatus 1001, and makes it ready to start the application a 4002. More specifically, the application installing unit stores the decrypted application a 4002 and the license 8001 into a predetermined directory on the disk 3007.

In step 12011, the application installing unit determines whether the installation process in step 12010 has ended normally. If the installation process has ended normally, the application installing unit proceeds to step 12012. If the installation process has not ended normally, the application installing unit proceeds to step 12023.

In step 12012, the application installing unit instructs the installation to a linked device. In the present exemplary embodiment, the linked device is the multifunction peripheral 1003. The application installing unit acquires the application b 4004 and the license b 4011 from the information 5003 and 6003, and instructs the multifunction peripheral 1003 to install the application b 4004 via the communication I/F (2) 3009.

In the present exemplary embodiment, the multifunction peripheral 1003 also has an application installing unit, and a similar installation process as this flowchart is executed.

In step 12013, the application installing unit determines whether the installation instruction in step 12012 has ended normally. If the installation instruction has ended normally, the application installing unit proceeds to step 12014. If the installation instruction has not ended normally, the application installing unit proceeds to step 12023.

In step 12014, the application installing unit determines whether to start the application for its own device in first. The application installing unit analyzes the information 5004 to determine the sequential order of applications to be started. If the application installing unit determines that the application for its own device is to be started in first, the application installing unit proceeds to step 12015. I the application installing unit determines that the application for its own device is not to be started in first, the application installing unit proceeds to step 12019.

In step 12015, the application installing unit starts the application installed on the information processing apparatus 1001. The application installing unit starts the application a 4002 installed in step 12010.

In step 12016, the application installing unit determines whether the start of the application in step 12015 has succeeded. If the start of the application in step 12015 has succeeded, the application installing unit proceeds to step 12017. If the start of the application in step 12015 has not succeeded, the application installing unit proceeds to step 12023.

In step 12017, the application installing unit instructs the start of the application for the linked device. The application installing unit instructs the multifunction peripheral 1003 to start the application b 4004 via the communication I/F (2) 3009.

In step 12018, the application installing unit determines whether the application start instruction in step 12017 has succeeded. If the application start instruction has succeeded, the application installing unit ends the processing of this flowchart. If the application start instruction has not succeeded, the application installing unit proceeds to step 12023.

In step 12019, the application installing unit performs the same processing as step 12017. In step 12020, the application installing unit determines whether the application start instruction in step 12019 has succeeded. If the application start instruction has succeeded, the application installing unit proceeds to step 12021. If the application start instruction has not succeeded, the application installing unit proceeds to step 12023.

In step 12021, the application installing unit performs the same processing as step 12015. In step 12022, the application installing unit determines whether the start of the application in step 12021 has succeeded. If the start of the application has succeeded, the application installing unit ends the processing of this flow chart. If the start of the application has not succeeded, the application installing unit proceeds to step 12023.

In step 12023, the application installing unit performs various error processing. The application installing unit performs processes to inform the user that the application installation has not been made normally, or to inform the user that the start of the application after installation has not been made normally. The application installing unit ends the processing of this flowchart after completion of step 12023.

In step 12024, the application installing unit installs an application. The application installing unit performs the same process as step 12010. In step 12025, the application installing unit determines whether the installation process in step 12024 has ended normally. If the installation process has ended normally, the application installing unit proceeds to step 12026. If the installation process has not ended normally, the application installing unit proceeds to step 12027.

In step 12026, the application installing unit starts an application for its own device. The application installing unit performs the same process as step 12015. The application installing unit ends the processing of this flowchart after completion of step 12026. Additionally, although not illustrated in FIG. 12, a step for determining whether the start of the application has ended normally, for example, as in step 12016, may be added to this flowchart.

In step 12027, the application installing unit performs error processing. The application installing unit performs processing to inform the user that the application installation has not been made normally. The application installing unit ends the processing of this flowchart after completion of step 12027.

According to the first exemplary embodiment, mutually cooperating applications can be handled as a single application (for example, the application A 4001) between cooperating devices (for example, between the information processing apparatus 1001 and the multifunction peripheral 1003). Accordingly, a user does not have to be conscious about the inconsistency between applications (for example, between the application a 4002 and the application b 4004). Furthermore, each application is automatically installed on the associated device with the processing by the device.

Further, according to the present exemplary embodiment, for example, as shown in step 12015 and step 12017 in FIG. 12, applications after installation are automatically started so that an inconsistency at linked operations does not occur. Accordingly, user friendliness is further improved. Further, in the case that such an application does not work correctly if it is not started in the sequential order determined between linked devices, applications can be started in their correct sequential order. Since the user does not have to start applications while paying attention to such a starting sequential order, user friendliness can be further improved.

Furthermore, according to the present exemplary embodiment, for example, as shown in FIG. 4 and FIG. 6, applications and licenses are associated mutually. Accordingly, the user can efficiently control licenses concerning the installation of applications.

Moreover, according to the present exemplary embodiment, for example, as shown in FIG. 4, an application is encrypted, and there is arranged a decryption key in the license associated with the application. Accordingly, for example, as shown in step 12005 and step 12009 in FIG. 12, the device can decrypt an installed application using the decryption key included in the license associated with the application. That is, security concerning applications or installation of applications can be improved.

Still further, according to the present exemplary embodiment, for example, as shown in FIG. 6 and FIG. 10, information identifying a device permitted to install an application is included in property information of a license associated with the application. Accordingly, for example, as shown in step 12004 in FIG. 12, the device can determine (identify) an information processing apparatus to which installation is available. Accordingly, applications can be reduced or prevented from being installed on unintended devices.

Furthermore, according to the present exemplary embodiment, the information processing apparatus 1001 and the multifunction peripheral 1003 have application installing units, and perform processing as shown in FIG. 12. Accordingly, when an application is installed on any of plural linked devices, an application is installed on other devices. Therefore, user friendliness can be further improved.

Second Exemplary Embodiment

In the first exemplary embodiment, the information processing apparatus 1001 generates the installation instruction of applications and the start instruction of applications to the multifunction peripheral 1003 connected via the local network 1002 based on the information 5003.

However, for example, if information identifying the multifunction peripheral 1008 connected via the network 1007 is set in the information 5003, the following processing can be performed. That is, the information processing apparatus 1001 searches for the multifunction peripheral 1008 connected via the network 1007 based on the information 5003. Then, the information processing apparatus generates the installation instruction of applications and the start instruction of applications to the multifunction peripheral 1008.

As described above, according to exemplary embodiments, applications adapted for mutually cooperating devices can be automatically installed on the respective devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-355139 filed Dec. 8, 2005, which is hereby incorporated by reference herein in its entirety.

What is claimed is:

1. An information processing apparatus which can communicate with an external device, comprising:

a receiving unit configured to receive information indicating that a first application is to be installed on the information processing apparatus and a second application is to be installed on the external device, the first application, the second application, a first license corresponding to the first application, and a second license corresponding to the second application; and a controlling unit configured to determine whether the first license permits the information processing apparatus to install the first application, to determine whether the second license permits the external device to install the second application, to install the first application on the information processing apparatus in a case where it is determined that the first license permits the information processing apparatus and the second license permits the external device and to instruct the external device to install the second application on the external device in a case where it is determined that the first license permits the information processing apparatus and the second license permits the external device, wherein in a case where it is determined that the first license does not permit the information processing apparatus or the second license does not permit the external device, the controlling unit does not install the first application and does not instruct the external device to install the second application.

2. The information processing apparatus according to claim 1, wherein the first license includes information identifying the information processing apparatus associated with the first application, and the second license includes information identifying the external device associated with the second application.

3. The information processing apparatus according to claim 2, wherein the receiving unit further receives start order information indicating a start order of the first application and the second application, and wherein the controlling unit determines, based on the start order information, whether to instruct the external device to start the installed second application before the installed first application is started, or to start the first application before instructing the external device to start the installed second application.

4. The information processing apparatus according to claim 3, wherein the first application and the second application are encrypted, wherein the receiving unit further receives first decryption information for decrypting the encrypted first application, wherein the receiving unit further receives second decryption information for decrypting the encrypted second application, and wherein the controlling unit decrypts the encrypted first application using the first decryption information, and sends the second decryption information together with the second application to the external device.

5. A method for installing an application on an information processing apparatus which can communicate with an external device, the method comprising:

receiving information indicating that a first application is to be installed on the information processing apparatus and a second application is to be installed on the external device, the first application, the second application, a first license corresponding to the first application, and a second license corresponding to the second application;

determining whether the first license permits the information processing apparatus to install the first application;

determining whether the second license permits the external device to install the second application;

installing the first application on the information processing apparatus, in a case where it is determined that the first license permits the information processing apparatus and the second license permits the external device; and instructing the external device to install the second application on the external device, in a case where it is determined that the first license permits the information processing apparatus and the second license permits the external device, wherein the information processing apparatus does not install the first application and does not instruct the external device to install the second application, in a case where it is determined that the first license does not permit the information processing apparatus or the second license does not permit the external device.

6. A storage medium storing a program for executing a method for installing an application on an information processing apparatus which can communicate with an external device, the program comprising:

a receiving module for receiving information indicating that a first application is to be installed on the information processing apparatus and a second application is to be installed on the external device, the first application, the second application, a first license corresponding to the first application, and a second license corresponding to the second application;

a determining module determining whether the first license permits the information processing apparatus to install the first application and determining whether the second license permits the external device to install the second application;

an installing module for installing the application on the information processing apparatus, in a case where it is determined that the first license permits the information processing apparatus and the second license permits the external device; and an instructing module for instructing the external device to install the second application on the external device, in a case where it is determined that the first license permits the information processing apparatus and the second license permits the external device, wherein the installing module and the instructing module are not executed in a case where it is determined that the first license does not permit the information processing apparatus or the second license does not permit the external device.

* * * * *